United States Patent
Lu et al.

(10) Patent No.: US 12,061,851 B1
(45) Date of Patent: Aug. 13, 2024

(54) SYSTEMS AND METHODS FOR DESIGNING PHOTONIC COMPUTATIONAL ARCHITECTURES

(71) Applicant: X Development LLC, Mountain View, CA (US)

(72) Inventors: Jesse Lu, East Palo Alto, CA (US); Brian John Adolf, San Mateo, CA (US); Martin Friedrich Schubert, Mountain View, CA (US)

(73) Assignee: X Development LLC, Mountain View, CA (US)

( * ) Notice: Subject to any disclaimer, the term of this patent is extended or adjusted under 35 U.S.C. 154(b) by 0 days.

(21) Appl. No.: 18/313,982

(22) Filed: May 8, 2023

Related U.S. Application Data

(63) Continuation of application No. 16/719,732, filed on Dec. 18, 2019, now abandoned.

(51) Int. Cl.
  *G06F 30/23* (2020.01)
  *G02B 27/00* (2006.01)
  *G06F 111/10* (2020.01)

(52) U.S. Cl.
  CPC ......... *G06F 30/23* (2020.01); *G02B 27/0012* (2013.01); *G06F 2111/10* (2020.01)

(58) Field of Classification Search
  CPC ........ G06F 30/23; G06F 30/25; G06F 30/367; G06F 30/398; G06F 2111/00–2119/22; G02B 27/0012
  See application file for complete search history.

(56) References Cited

U.S. PATENT DOCUMENTS

| | | |
|---|---|---|
| 6,356,681 B1 | 3/2002 | Chen |
| 6,408,119 B1 | 6/2002 | Meltz et al. |
| 6,456,762 B1 | 9/2002 | Nishiki |

(Continued)

OTHER PUBLICATIONS

Callewaert, F. "Inverse-Design and Fabrication of Electromagnetic Devices" [Thesis] Field of Electrical Engineering, Northwestern University [retrieved on Mar. 12, 2022] (Year: 2018).*

(Continued)

*Primary Examiner* — Rehana Perveen
*Assistant Examiner* — Alfred H B Wechselberger
(74) *Attorney, Agent, or Firm* — Fish & Richardson P.C.

(57) ABSTRACT

Methods and systems for designing a photonic computational architecture including a plurality of optical components. At least some of the methods include: defining a loss function within a simulation space composed of a plurality of voxels, the simulation space encompassing the plurality of optical components; defining an initial structure for the photonic computational architecture in the simulation space, at least some of the voxels corresponding to each of the plurality of optical components and having a dimension smaller than an operative wavelength of the computational architecture; determining values for at least one structural parameter and/or at least one functional parameter for each of the plurality of optical components using a numerical solver to solve Maxwell's equations; and defining a final structure of the photonic computational architecture based on the values for the one or more structural and/or functional parameters.

20 Claims, 6 Drawing Sheets

(56) References Cited

U.S. PATENT DOCUMENTS

| | | | |
|---|---|---|---|
| 6,477,194 | B1 | 11/2002 | Eng |
| 6,681,067 | B1 | 1/2004 | Kersey |
| 6,768,850 | B2 | 7/2004 | Dugan et al. |
| 6,847,762 | B2 | 1/2005 | Sweetser et al. |
| 6,946,684 | B2 | 9/2005 | Shigihara |
| 6,956,994 | B2 | 10/2005 | Bernard |
| 8,380,027 | B2 | 2/2013 | Reed |
| 10,592,732 | B1 | 3/2020 | Sather et al. |
| 11,092,746 | B1 | 8/2021 | Adolf et al. |
| 11,256,841 | B1* | 2/2022 | Lamant ............... G06F 30/367 |
| 2003/0186142 | A1 | 10/2003 | Deshmukh et al. |
| 2004/0028104 | A1 | 2/2004 | Buda |
| 2004/0196884 | A1 | 10/2004 | Ohkubo |
| 2005/0226558 | A1 | 10/2005 | Kim et al. |
| 2006/0078258 | A1 | 4/2006 | Anisimov et al. |
| 2008/0013581 | A1 | 1/2008 | Kobayashi |
| 2008/0089374 | A1 | 4/2008 | Eichler |
| 2011/0102799 | A1 | 5/2011 | Matejka et al. |
| 2016/0012176 | A1 | 1/2016 | Liu et al. |
| 2016/0164260 | A1 | 6/2016 | Chua |
| 2017/0179680 | A1 | 6/2017 | Mahgerefteh |
| 2018/0024297 | A1 | 1/2018 | Bovington et al. |
| 2018/0045953 | A1 | 2/2018 | Fan et al. |
| 2018/0053334 | A1 | 2/2018 | Schneider |
| 2018/0189425 | A1* | 7/2018 | Van Vaerenbergh ... G06F 30/30 |
| 2020/0050715 | A1 | 2/2020 | Krishnannurthy et al. |
| 2020/0226221 | A1 | 7/2020 | Lu et al. |
| 2021/0007702 | A1 | 1/2021 | Lee et al. |
| 2021/0305767 | A1 | 10/2021 | Schubert et al. |

OTHER PUBLICATIONS

Arellano, C. "Efficient Design of Photonic Integrated Circuits" 2011 13th International Conference on Transparent Optical Networks; DOI: 10.1109/ICTON.2011.5970850 [retrieved on Mar. 4, 2024] (Year: 2011).*

Nielsen et al. "Topology Optimization of Compact E-Plane Waveguide Filters" Topology optimization and experimental verification of compact E-plane waveguide filters. Microwave and Optical Technology Letters, 61(5), 1208-1215. (Published Jan. 2019) [retrieved on Mar. 4, 2024] (Year: 2019).*

Piggott, A. "Automated Design of Photonic Devices" [Thesis] Department of Electrical Engineering, Stanford University [retrieved on Mar. 11, 2022] (Year: 2018).*

Chan et al. "Architectural Exploration of Chip-Scale Photonic Interconnection Network Designs Using Physical-Layer Analysis" Journal of Lightwave Technology, vol. 28, No. 9, May 1, 2010 [retrieved on Mar. 3, 2024] (Year: 2010).*

Frellsen , L. "Topology Optimized Components for Mode- and Wavelength Division Multiplexing" [Thesis] Department of Photonics Engineering, Technical University of Denmark [retrieved on Mar. 4, 2024] (Year: 2016).*

Bernhardi, "Bragg-Grating-Based Rare-Earth-Ion-Doped Channel Waveguide Lasers and Their Applications," Dissertation for the degree of Doctor, University of Twente, Faculty of Electrical Engineering, Nov. 22, 2012, 168 pages.

Bernhardi, "Fourteen Philosophy Thesis Topic Ideas for University Students," Dissertation for the degree of Doctor University of Twente, Integrated Optical MicroSystems (IOMS) group, Faculty of Electrical Engineering, Mathematics and Computer Science, MESA+ Institute for Nanotechnology, Apr. 1982, 169 pages.

Borel et al., "Topology optimization and fabrication of photonic crystal structures," Optics Express, May 2004, 12(9):6 pages.

Boutanni et al., "Efficient pixel-by-pixel optimization of photonic devices utilizing the Dyson's equation in a Green's function formalism: Part II. Implementation using standard electromagnetic solvers," Journal of the Optical Society of America, Sep. 2019, 36(9)2387-2394.

Damask, "Integrated-Optic Grating-Based Filters For Optical Communications Systems," Thesis for the degree of Doctor of Philosophy, Massachusetts Institute of Technology, May 6, 1996, 282 pages.

Frei et al., "Topology optimization of a photonic crystal waveguide termination to maximize directional emission," Appl. Phys. Lett. 86, Mar. 2005, 86:111114.

Ghanem et al., "Information Fusion: Scaling Subspace-Driven Approaches," arXiv:2204.12035, Apr. 26, 2022, 18 pages.

Guo et al. "Study on a Recurrent Convolutional Neural Network Based FDTD Method," 2019 International Applied Computational Electromagnetics Society Symposium-China (ACES), Oct. 31, 2022, 9 pages.

Hughes, "Adjoint-Based Optimization and Inverse Design oh Photonic Devices," Thesis for the degree of Doctor of Philosophy, Stanford University, Department of Applied Physics, Aug. 2019, 158 pages.

Lee et al., "Metasurface eyepiece for augmented reality," Nature Communications, Nov. 2018, 9(1):1-10.

Li et al. "Enabling High Performance Deep Learning Networks on Embedded Systems," IECON 2017—43rd Annual Conference of the IEEE Industrial Electronics Society, Nov. 1, 2022, 6 pages.

Mauricio et al., "Design Framework for metasurface optics-based convolutional neural networks," Applied Optics, May 2021, 60(15):4356-4365.

Molesky et al., "Inverse design in nanophotonics," Nature Photonics, Nov. 2018, 12:659-670.

Molesky, "Outlook for inverse design in nanophotonics," CoRR, Jan. 2018, arxiv.org/abs/1801.06715, 13 pages.

News.mit.edu [Online] "New system allows optical deep learning," Jun. 12, 2017, retrieved on Oct. 9, 2018, retrieved from URL <http://news.mit.edu/2017/new-system-allows-optical-deep-learning-0612>, 3 pages.

Piggot, "Automated Design of Puotonic Devices," Dissertation for the degree of Doctor of Philosophy, Stanford University, Department of Electrical Engineering, Jun. 2018, 114 pages.

Piggott et al., "Fabrication-constrained nanophotonic inverse design," Scientific Reports, May 2017, 7(1786): 1-7 pages.

Sitzmann et al., "End-to-end Optimization of Optics and Image Processing for Achromatic Extended Depth of Field and Super-resolution Imaging," ACM Trans. Graph., Aug. 2018, 37(4):1-13.

Springer.com [Online] "Supplementary Information: Fabrication-constrained nanophotonic inverse design," May 2017, retrieved on Oct. 9, 2018, retrieved from URL <https://static-content.springer.com/esm/art%3A10.1038%2Fs41598-017-01939-2/MediaObjects/41598_2017_1939_MOESM2_ESM.pdf>, 10 pages.

Tahersima et al., "Deep Neural Network Inverse Design of Integrated Nanophotonic Devices," CoRR, Sep. 2018, arxiv.org/abs/1809.03555, 8 pages.

Tahersima et al., "Nanostructured Photonic Power Splitter Design via Convolutional Neural Networks," 2019 Conference on Lasers and Electro-Optics, Oct. 31, 2022, 2 pages.

Trivedi, et al., "Data-driven acceleration of photonic simulations," Scientific Reports, Dec. 23, 2019, 9:19728.

Udupa et al., "Voxelized Topology Optimization for Fabrication Compatible Inverse Design of 3D Photonic Devices," Optics Express, Jul. 2019, 27(15):21988-21998.

Wikipedia.com (Online) "Kernel (image processing)," Dec. 7, 2019, retrieved on Oct. 11, 2022, retrieved from URL «https://en.wikipedia.org/w/index.php?title=Kernel_(image_processing)&oldid=929690058», 6 pages.

Winick et al., "Design of Grating-Assisted Waveguide Couplers with Weighted Coupling," Journal of Lightwave Technology, Nov. 1991, 9(11): 1481-1491.

Xu et al., "Navigating through complex photonic design space using machine learning methods," SPIE Optics + Optoelectronics, Apr. 2019, 11031:110310S-1.

Yin, "Photonic Inverse Design for 3-D Structures and Optical Phase Change Materials," Massachusetts Institute of Technology, Jun. 2019, 85 pages.

Yu et al., "Inverse-Design-based Light Via for Multi-Layer Photonic Integration Circuit," 2018 Asia Communications and Photonics Conference, 2018, 3 pages.

* cited by examiner

SYSTEMS AND METHODS FOR DESIGNING PHOTONIC COMPUTATIONAL ARCHITECTURES

CROSS-REFERENCE TO RELATED APPLICATION

This application is a continuation of U.S. patent application Ser. No. 16/719,732, filed on Dec. 18, 2019, which is incorporated herein by reference in its entirety.

TECHNICAL FIELD

This disclosure generally relates to optical interfaces to computational hardware.

BACKGROUND

Photonic integrated circuits (which, in some cases, may be referred to as planar lightwave circuits or integrated optoelectronic devices) are devices on which several optical (and often also electronic) components are integrated. Photonic integrated circuits can be fabricated with wafer-scale technology (which can involve lithography) on substrates (often called "chips") of silicon, silica, or nonlinear crystal materials, such as lithium niobate (LiNbO3). The substrate material can determine a number of features and limitations of the integrated circuits. Photonic integrated circuits can either host large arrays of identical components, or contain complex circuit configurations. An area of strong current interest in the field of photonic integrated circuits is silicon photonics, where photonic functions are implemented directly on silicon chips. Applications of photonic integrated circuits include, for example, optical fiber communications, optical sensors, and metrology.

SUMMARY

This specification describes systems and methods for designing photonic computational architectures. The photonic computational architectures can allow the use of light in computational hardware without requiring the generation of light on a computational unit of the computational architecture (for example, a silicon chip) and/or reducing the need for having one light source per computational unit of the computational architecture. In some implementations, the systems and methods described in this specification involve using an inverse design tool to determine the design of one or more optical components of the photonic computational architecture (for example, couplers, computational units, modulators, waveguides, and so forth) such that insertion loss is minimized in accordance with one or more parameters. Example parameters can include number of modulators, types of modulators, material used for computational units, waveguide materials, waveguide length, laser type, optical coupler type, and so forth.

In some implementations, the designed computational architecture is a stacked architecture that includes a plurality of computational units, in which the plurality of computational units include a first computational unit and at least one second computational unit stacked on the first computational unit. The first computational unit can receive an optical signal (e.g., light) from an optical source and process a first portion of the optical signal according to one or more properties of the optical signal (e.g., frequency, wavelength, and so forth). For example, the first computational unit can be configured to read information from a first one or more wavelengths of the optical signal, modulate the first one or more wavelengths of the optical signal, or both. A second computational unit can receive output from the first computational unit and process a second portion of the optical signal according to the one or more properties of the optical signal (for example, a second one or more wavelengths). In some implementations, the second computational unit is capable of reading or using the effects of the first computational unit to process the second portion. In some implementations, the second computational unit can process the first portion of the optical signal that has been processed by the first computational unit.

In some implementations, the designed computational architecture can include a primary-secondary architecture that includes a primary computational unit and one or more secondary computational units (which, in this specification, may sometimes be referred to as a sub-processing unit). The primary computational unit can receive an optical signal and read/modulate the optical signal. The one or more secondary computational units can receive the modulated light from the primary computational unit, and each of the one or more secondary computational units can process a specific wavelength (or wavelengths) of the modulated optical signal. The secondary computational units can then transmit the processed optical signal back to the primary computational unit, which can perform further processing. In some implementations, the architecture includes a plurality of primary computational units, in which each primary computational unit is assigned a dedicated optical channel. For example, this can be realized with N−1 channels received/sent by each computational unit.

In an aspect, a system is provided. The system includes one or more processors. The system includes computer storage storing executable computer instructions in which, when executed by the one or more processors, cause the one or more processors to perform one or more operations. The one or more operations include defining a loss function within a simulation space composed of a plurality of voxels, the simulation space encompassing the plurality of optical components, the loss function corresponding to a target insertion loss resulting from an interaction between an input electromagnetic field and the plurality of optical components. The one or more operations include defining an initial structure for the photonic computational architecture in the simulation space, at least some of the voxels corresponding to each of the plurality of optical components and having a dimension smaller than an operative wavelength of the computational architecture. The one or more operations include determining, using a computer system, values for at least one structural parameter and/or at least one functional parameter for each of the plurality of optical components using a numerical solver to solve Maxwell's equations so that a loss determined according to the loss function is within a threshold loss. The one or more operations include defining a final structure of the photonic computational architecture based on the values for the one or more structural and/or functional parameters.

The plurality of optical components can include two or more stacked optical processing units. The plurality of optical components can include a primary optical processing unit and two or more secondary optical processing units. The plurality of optical components can include at least one of: an optical processing unit, a coupler, or a waveguide.

The at least one structural parameter can include one or more of: a waveguide composition, an optical processing unit composition, or a coupler composition. At least some of the voxels can include a dimension of not more than 0.1 times the operative wavelength in the material with the largest refractive index. Determining values for at least one structural parameter can include determining a refractive index at each voxel. Determining values for at least one functional parameter can include determining one or more of: an insertion loss or a modulation format.

Solving Maxwell's equations can include using a finite-difference time domain solver.

Defining a final structure of the one or more optical components can include defining a material composition at each optical component.

These and other aspects, features, and implementations can be expressed as methods, apparatus, systems, computer storage storing executable computer instructions, components, program products, methods of doing business, means or steps for performing a function, and in other ways, and will become apparent from the following descriptions, including the claims.

DETAILED DESCRIPTION

Figure 1A:
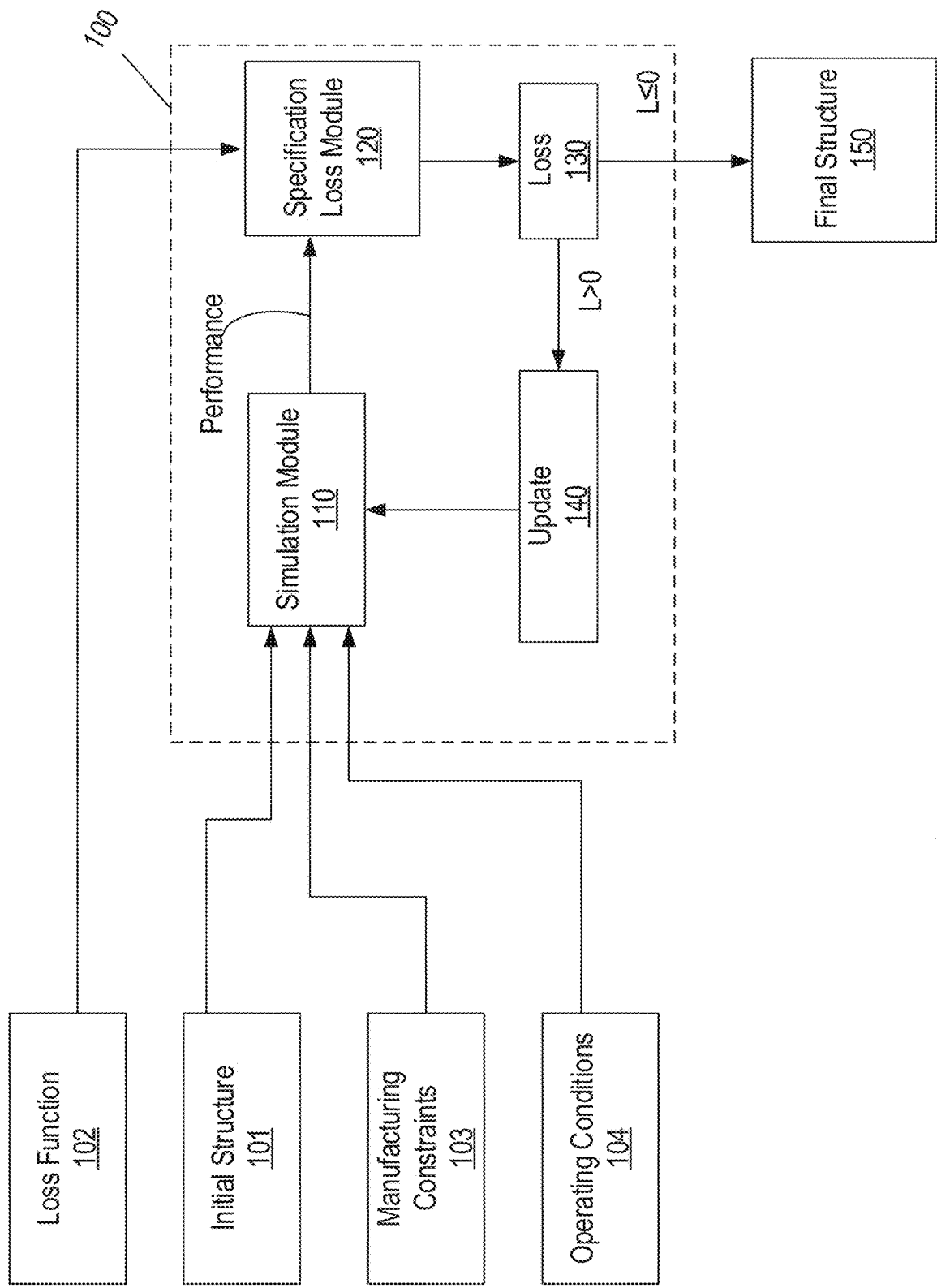
FIG. 1A shows an architecture for a computational inverse design tool that uses a simulation module and a specification loss module to iteratively simulate the performance of an optical device and determine a loss for the device.
Figure 1B:
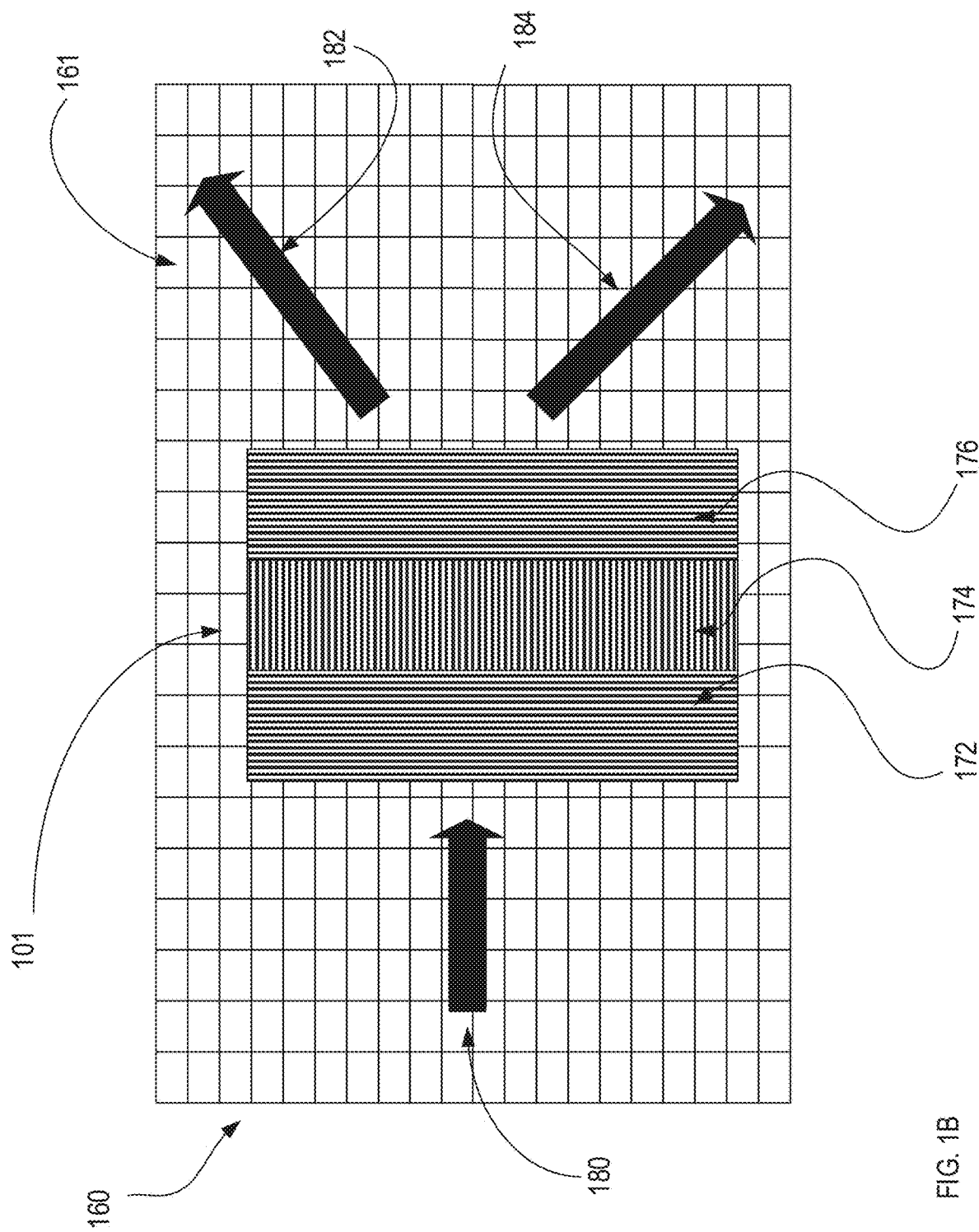
FIG. 1B shows an initial structure for a beam splitter as defined within a simulation space.

Referring to FIGS. 1A-1B, the structure of the computational architecture is determined using a design tool 100, which refers to a computational engine that determines a design for the computational architecture that satisfies pre-specified performance criteria. Such an approach to design is referred to as "inverse design" and the computational engine for solving such problems is referred to as an "inverse design tool."

In certain implementations, the inverse design problem involves having a designer specify the performance criteria for the optical device in terms of a "loss function," L (also sometimes referred to a "cost function"), which represents a variation of the performance of a given design for the computational architecture from the specified performance. When L is below a specified threshold, e.g., $L \leq 0$, for a given design, it signifies that the specified performance has been met. By appropriately defining the loss, the inverse problem can therefore be expressed as finding a design, z, for the computational architecture which satisfies $L \leq 0$.

Inverse design problems can be solved computationally through a combination of a simulation module and a loss module. The simulation module is used to mathematically model a physical system incorporating a given design for the optical device using equations that describe the physical properties of the physical system, such as Maxwell's equations. The simulation module can also mathematically account for constraints involved in manufacturing (e.g., structure sizes, structure shapes, and material properties) and operating the architecture (e.g., thermal effects). The loss module determines the loss for a particular design, effectively evaluating the performance of the architecture compared to the desired performance.

FIG. 1A shows an architecture for a computational inverse design tool 100 that uses a simulation module 110 and a loss module 120 to iteratively simulate the performance of an optical computational architecture and determine a loss 130 for the optical computational architecture. Depending on whether the loss exceeds (e.g., $L>0$) or meets (e.g., $L \leq 0$) a specified threshold value, the design tool can either update (140) a component of the optical computational architecture or produce a final structure 150 for the optical computational architecture.

The design tool 100 uses a number of input parameters from a user in order to determine a final structure for the optical computational architecture. These include an initial structure 101 for the optical computational architecture, a loss function 102, manufacturing constraints 103 and operating conditions 104. Initial structure 101 generally includes a starting point for the composition and dimensions for the optical computational architecture. Loss function 102 is based on the desired performance of the optical computational architecture and is typically defined by a desired electric field profile. In many cases, the desired electric field profile corresponds to an electric field output by the optical computational architecture in response to a particular input or inputs. Manufacturing constraints 103 incorporate constraints based on practical manufacturing considerations. For example, manufacturing constraints can be associated with an amount of spacing between components, size of one or more components (e.g., size in one dimension, e.g., width, and/or overall size, e.g., volume), radius of curvature of one or more components, maximum cost of potential materials, availability of potential materials, and so forth. Operating conditions 104 account for other physical properties of the system, such as sources or sinks of electromagnetic fields, operating temperature, etc.

Before discussing the application of the inverse design tool to optical computational architectures, it is instructive to consider the example of a simple beam splitter. FIG. 1B shows an initial structure for a beam splitter as defined within a simulation space. Referring also to FIG. 1B, generally, initial structure 101 of the optical device is defined within a simulation space 160 composed of voxels 161. Voxels are three-dimensional volume elements at which physical properties (e.g., refractive index, field values, and temperature) can be defined and/or calculated. Each voxel 161 can be sub-wavelength (e.g., $0.5\lambda$, or less, $0.2\lambda$, or less, $0.1\lambda$, or less, or $0.05\lambda$, or less) for a particular wavelength of interest in at least one dimension. In many cases, voxels are sub-wavelength in three dimensions.

As illustrated, initial structure 101 is composed of three regions 172, 174, and 176 each composed of a different material. Each extends across multiple voxels. Arrow 180 represents an input electromagnetic field incident on one side of initial structure 101. This field is a component of operating conditions 104, input into the simulation module 110. Arrows 182 and 184 represent the desired performance (e.g., the desired electric field profile output by the optical device in response to the input electromagnetic field) of the optical device and the loss can be established as a difference, on a voxel by voxel basis, between the electromagnetic field represented by these arrows and the electromagnetic field that results from the interaction between the input electromagnetic field and initial structure 101.

Referring again to FIG. 1A, simulation module 110 determines the performance of the optical computational architecture using a differentiable solver for Maxwell's equations to model electromagnetic fields resulting from the one or more sources interacting with the structure defined for the optical computational architecture. In one form, Maxwell's equations can be expressed as:

$$\frac{\partial H}{\partial t} = -\frac{1}{\mu}(\nabla \times E - M_{source}); \text{ and}$$

$$\frac{\partial E}{\partial t} = \frac{1}{\epsilon}(\nabla \times H - J_{source}),$$

where E and H represent electric and magnetic fields, $\epsilon$ and $\mu$ represent permittivity and permeability of the material at each voxel, and $J_{source}$ and $M_{source}$ are electric and magnetic currents. Numerical solution of Maxwell's equations yields electric and magnetic field values at each voxel, from which design tool 100 can calculate loss 130 for each voxel using loss module 120.

In some embodiments, a finite difference time domain (FDTD) approach is used to solve Maxwell's equations. Details of such an approach can be found, for example, in *Computational Electrodynamics: the Finite-Difference Time-Domain Method*, Third Edition, by A. Taflove and S. C. Hagness (Artech House, 2005). Such an approach involves updating values of the electric and magnetic fields at each voxel through a series of incremental time steps. Mathematically, this update operation can be expressed by a function $\varphi$, where $$x_{i+1} = \varphi(x_i, b_i, z)$$

for i=1, . . . , n. Here, n is the total number of time steps for the simulation, $x_i$ refers to the electric and magnetic fields at time step i, $b_i$ represents electric and magnetic sources at time step i, and z is a structural variable, corresponding to the topology of the optical computational architecture. Additionally, the loss operation can be expressed as $L=f(x_1, \ldots, x_n)$ and takes as input all the computed fields and produces a single, real-valued scalar that can be minimized.

In such implementations, inverse design tool 100 can optimize a structure for the optical computational architecture (i.e., final structure 150 in FIG. 1A) based on a structural gradient, $\partial L/\partial z$ according to the formalism above. This structural gradient can be determined according to the relationship:

$$\frac{dL}{dz} = \sum_i \frac{\partial L}{\partial x_i} \frac{\partial x_i}{\partial z}.$$

The above calculations can be performed using a convolutional neural network formalism in which the matrices representing the FDTD set of equations are sparsely populated such that the calculations can be efficiently performed using one or more tensor processing units.

The loss function, L, for an optical computational architecture can be established in a variety of ways but generally involves defining a desired electric field distribution (or corresponding measure of electric field strength, such as intensity) at multiple wavelengths (or, correspondingly, frequencies) and comparing a simulated electric field distribution to the desired distribution at each of those wavelengths. The comparison can involve simply determining a difference at each voxel for which the desired distribution is defined or a difference of squares.

The loss function is generally defined as at least a plurality of operational wavelengths of the component. For example, in applications where the optical computational architecture is expected to operate at a number of discrete wavelengths of interest, the loss function can incorporate the performance of the optical computational architecture at each of these wavelengths. The number of wavelengths can vary as necessary. For example, some applications can include a large number of wavelengths (e.g., 20 or more wavelengths, 50 or more wavelengths, or 100 or more wavelengths) spanning a range of operational wavelengths. Alternatively, the loss function can be defined for a representative subset of the operational wavelengths. For instance, where the operational wavelengths span a range of wavelengths, the loss function can be evaluated for a finite number of discrete wavelengths spanning (e.g., evenly spanning) the operational range.

Figure 2:
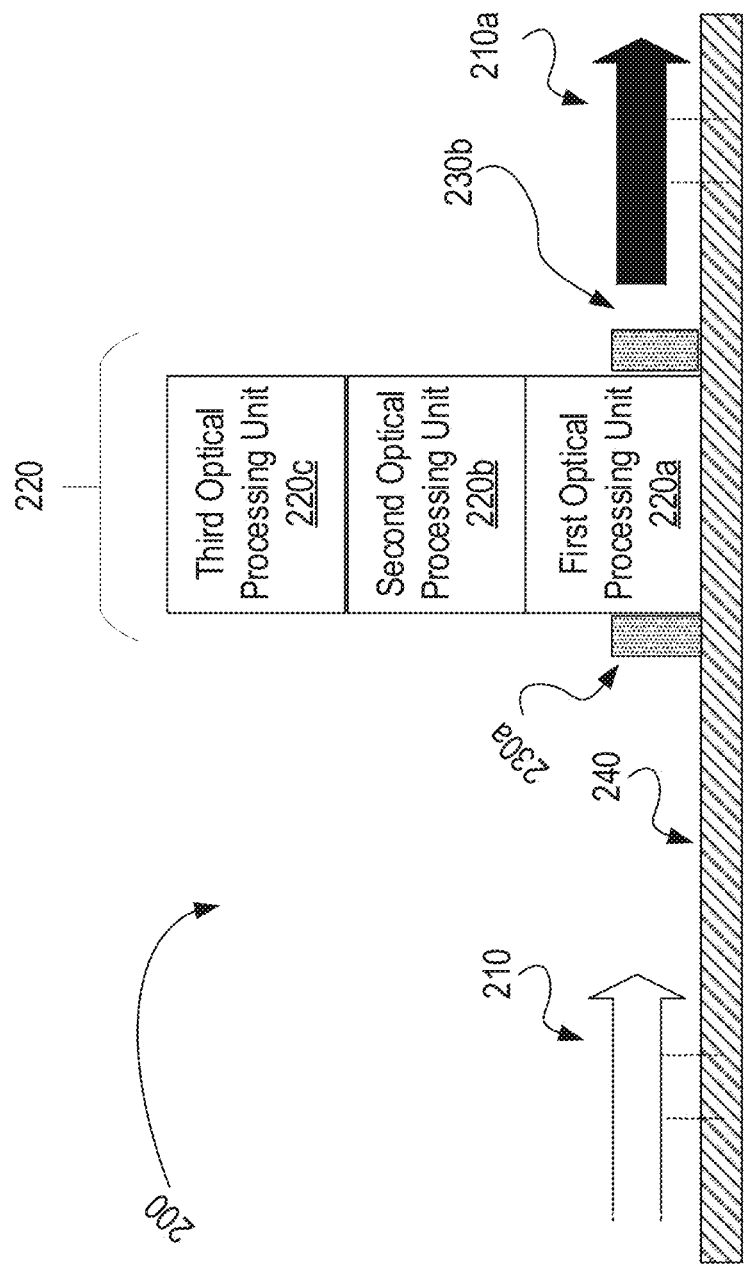
FIG. 2 shows an example of an initial structure of a photonic computational architecture having a stacked configuration.

Turning now to the example of an optical computational architecture, an initial structure of an optical computational architecture 200 in a stacked configuration is shown in FIG. 2. The architecture 200 includes a waveguide 240, a first optical coupler 230a, a second optical coupler 230b and a plurality of optical processing units 220.

The waveguide 240 is configured to carry an optical signal 210, which can be generated by an optical source (not shown), such as a laser transmitter. The waveguide 240 can be fabricated using one or more types of materials. For example, portions of the waveguide 240 can be fabricated on silica glass (for example, fused silica) using lithographic techniques involving chemical processing or indiffusion of dopants, or with laser micromachining. Portions of the waveguide 240 can be fabricated on lithium niobate substrates using, for example, proton exchange or by in diffusion of titanium. Portions of the waveguide 240 can be doped with rare earth ions (such as, neodymium, ytterbium, erbium, thulium, and so forth) to facilitate amplification and laser functionality.

The first optical coupler 230a is configured to couple the input signal 210 into a first optical processing unit 220a of the plurality of optical processing units 220. The first optical coupler 230a can be one of several types of optical couplers, such as a grating coupler. The first optical coupler 230a can be fabricated from one or more materials. In some implementations, the first optical coupler 230a is configured to demultiplex the optical signal 210 in accordance with one or more properties of the optical signal 210. For example, the first optical coupler 230a can be configured to demultiplex the optical signal 210 based on wavelength. In some implementations, the first optical coupler 230a is configured to couple the input signal 210 into the first optical processing unit 220a without demultiplexing the signal. In coupling the input signal 210 into the plurality of optical processing units 220, the first optical coupler 230a may cause a certain amount of insertion loss, which refers to a loss in signal power resulting from the coupling of the optical signal 210. As will be demonstrated later with reference to FIG. 4, the first optical coupler 230a can be designed to minimize insertion loss.

In the illustrated example, the plurality of optical processing units 220 includes a first optical processing unit 220a, a second optical processing unit 220b, and a third optical processing unit 220c. However, in some implementations, the plurality of optical processing units 220 includes more or fewer optical processing units. Each of the plurality of optical processing units 220 can be computational chips. Each of the plurality of optical processing units 220 can be fabricated using one or more materials, such as silicon, silica, one or more types of nonlinear crystal material, or a combination of them. Each of the plurality of optical processing units 220 are configured to process (for example, read, modulate, or both) a portion of the optical signal 210. In some implementations, the portion of which a particular optical processing unit of the plurality of optical processing units 220 is configured to process is dependent on an optical property of the optical signal 210. For example, the optical signal 210 can include several wavelengths. In such instances, for example, the first optical processing unit 220a can receive the optical signal 210 from the first optical coupler 230a, processes a first portion of the optical signal 210 that includes a first wavelength (or first range of wavelengths) to the first optical processing unit 220a, and transmit the optical signal 210 (having a processed first portion) to the second optical processing unit 220b. The second optical processing unit 220b can process a second portion of the optical signal 210 that includes a second wavelength (or second range of wavelengths) and transmit the optical signal 210 (having a processed first and second portion) to the third optical processing unit 220c. The third optical processing unit 220c can process a third portion of the optical signal 210 that includes a third wavelength (or third range of wavelengths). The optical signal 210 having a processed first, second, and third portion can then be reflected back through the second optical processing unit 220b and first optical processing unit 220a, each of which can perform further processing on portions of the optical signal 210. Each of the plurality of optical processing units 220 can be configured to perform one or more types of modulation on corresponding portions of the optical signal 210. In some implementations, at least one of the plurality of optical processing units 220 is configured to perform amplitude modulation. In some implementations, at least one of the plurality of optical processing units 220 is configured to perform phase modulation. In some implementations, at least one of the plurality of optical processing units 220 is configured to perform spatial mode modulation. In some implementations, at least one of the plurality of optical processing units 220 is configured to perform polarization modulation. Although the illustrated implementations shows a specific sequence of optical communication between each of the plurality of optical processing units 220, other sequences are considered. For example, the first optical processing unit 220a can be in optical communication with the third optical processing unit 220c, such that the first optical processing unit 220a can transmit the optical signal 210 (or at least a portion of the optical signal 210) to the third optical processing unit 220c. In some implementations, each of the plurality of optical processing units 220 are configured to communicate globally with one another, such that a photonic interconnect can be realized that can serve as a data bus between each of the plurality of optical processing units 220.

The second optical coupler 230b is configured to receive the modulated portions of the optical signal 210 from the first optical processing unit 220a. In some implementations, the second optical coupler 230b is configured to receive individual portions of a demultiplexed modulated optical signal 210 and combine (for example, by multiplexing) each portions to generate a modulated optical output signal 210a. The second optical coupler 230b is configured to transmit the modulated optical output signal 210a to the waveguide 240, such that, for example, the modulated optical output signal 210a can traverse the waveguide 240 away from the plurality of optical processing units 220. The second optical coupler 230b can be one of several types of optical couplers, such as a grating coupler. The second optical coupler 230b can be fabricated from one or more materials. In coupling the modulated output signal 210a into the waveguide 240, the second optical coupler 230b may cause a certain amount of insertion loss. As will be demonstrated later with reference to FIG. 4, the second optical coupler 230b can be designed to minimize insertion loss.

Figure 3:
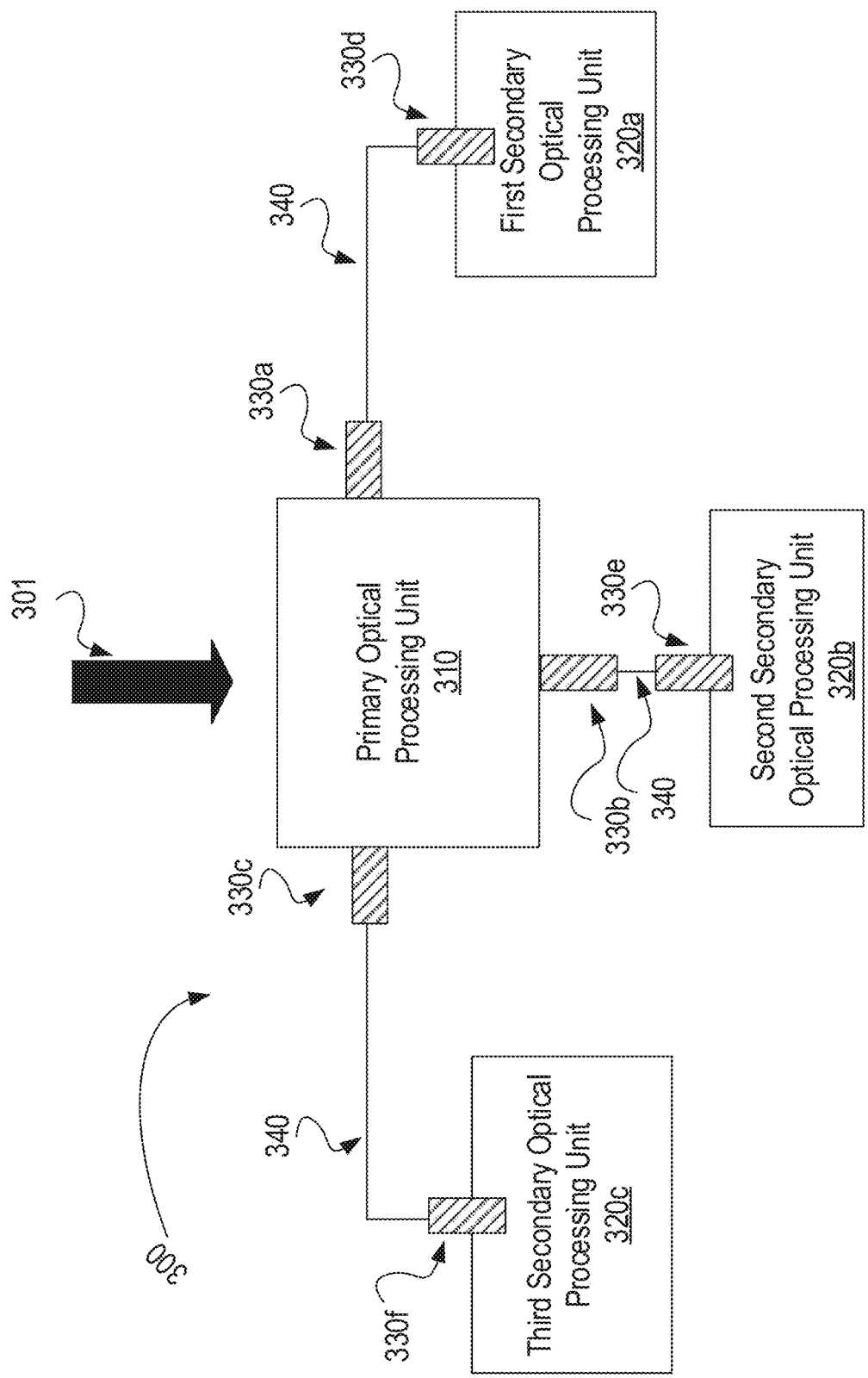
FIG. 3 shows an example of an initial structure of a photonic computational architecture having a primary-secondary configuration.

FIG. 3 shows an example of an initial structure of a photonic computational architecture 300 having a primary-secondary configuration. The computational architecture 300 includes a primary optical processing unit 310, a first secondary optical processing unit 320a, a second secondary optical processing unit 320b, a third secondary optical processing unit 320c, a first optical coupler 330a, a second optical coupler 330b, a third optical coupler 330c, a fourth optical coupler 330d, a fifth optical coupler 330e, a sixth optical coupler 330f (which, collectively, may be referred to, in this specification, as the optical couplers 330a-f in this specification), and a waveguide 340. Although the illustrated implementation includes three secondary optical processing units, the computational architecture 300 can include more or fewer secondary optical processing units.

The primary optical processing unit 310 and each of the secondary optical processing units 320a, 320b, 320c can be computational chips (for example, silicon chips). The primary optical processing unit 310 and each of the secondary optical processing units 320a, 320b, 320c can be fabricated using one or more material, such as, silicon, silica, one or more types of nonlinear crystal material, or a combination of them. In the illustrated implementation, the primary optical processing unit 310 is configured to receive an optical input signal 301. However, in some implementations, the primary optical processing unit 310 is configured to generate the optical input signal 301. In some implementations, the primary optical processing unit 310 is configured to transmit a portion of the input optical signal 301 to each of the secondary optical processing units 320a, 320b, 320c according to one or more features of the input optical signal 301. For example, the primary optical processing unit 310 can transmit a first portion of the optical signal 301 that includes a first wavelength (or first range of wavelengths) to the first secondary optical processing unit 320a, transmit a second portion of the optical signal 301 that includes a second wavelength (or second range of wavelengths) to the second secondary optical processing unit 320b, and transmit a third portion of the optical signal 301 that includes a third wavelength (or third range of wavelengths) to the third secondary optical processing unit 320c. In some implementations, the primary optical processing unit 310 is configured to read and/or modulate at least a portion of the input signal 301 before transmitting to the secondary optical processing units 320a, 320b, 320c.

Each of the secondary optical processing units 320a, 320b, 330c are configured to receive a corresponding portion of the input signal 301 and process (for example, read, modulate, or both) the corresponding portion of the input signal 301. Each of the secondary optical processing units 320a, 320b, 320c can be configured to perform one or more types of modulation on corresponding portions of the input optical signal 301. In some implementations, at least one of the secondary optical processing units 320a, 320b, 320c is configured to perform amplitude modulation. In some implementations, at least one of the secondary optical processing units 320a, 320b, 320c is configured to perform phase modulation. In some implementations, at least one of the secondary optical processing units 320a, 320b, 320c is configured to perform polarization modulation.

Each of the optical couplers 330a-f can be fabricated using one or more materials. Each of the optical couplers 330a-f can include one or more types of couplers. The optical couplers 330a-f are configured to couple the primary optical processing unit 310, and the secondary optical processing units 320a, 320b, 320c, to the waveguide 340. For example, the first optical coupler 330a can receive at least a portion of an optical signal from either the primary optical processing unit 310 or the waveguide 340, and transmit the received optical signal to the other of the primary optical processing unit 310 or the waveguide 340. Thus, the optical couplers 330a-f can provide similar coupling functionality as the optical couplers 230a and 230b described previously with reference to FIG. 2. Accordingly, the optical couplers 330a-f may cause some amount of insertion loss, and can be designed to reduce such insertion loss, as will be discussed later with reference to FIG. 4.

The waveguide 340 can be fabricated using one or more types of materials. For example, portions of the waveguide 340 can be fabricated on silica glass (for example, fused silica) using lithographic techniques involving chemical processing or in diffusion of dopants, or with laser micromachining. Portions of the waveguide 340 can be fabricated on lithium niobate substrates using, for example, proton exchange or by in diffusion of titanium. Portions of the waveguide 340 can be doped with rare earth ions (such as, neodymium, ytterbium, erbium, thulium, and so forth) to facilitate amplification and laser functionality.

Although the illustrated implementation includes one primary optical processing unit coupled to a plurality of secondary optical processing units, other configurations are considered. For example, the architecture 300 can include a plurality of primary optical processing units, in which each primary optical processing unit is communicatively coupled with one or more of the other primary optical processing units of the plurality of primary optical processing units. In such configurations, each primary optical processing unit can be assigned a dedicated optical channel and be communicatively coupled with one or more secondary optical processing units.

Figure 4:
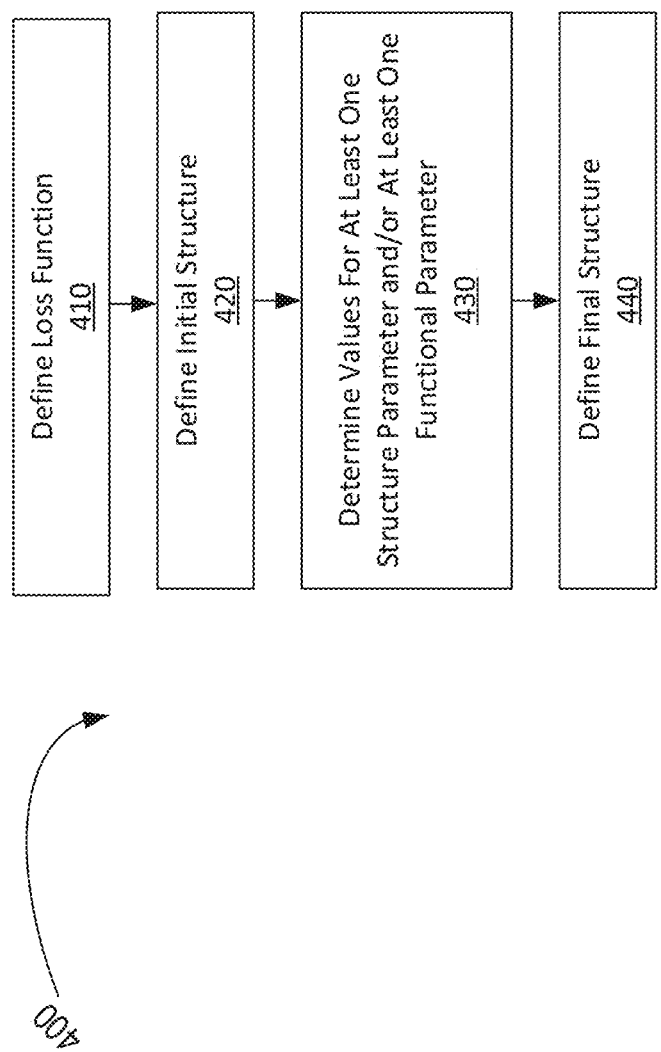
FIG. 4 is a flowchart showing a method for designing a photonic computational architecture, according to one or more embodiments of the present disclosure.

FIG. 4 is a flowchart showing a method for designing a photonic computational architecture, according to one or more embodiments of the present disclosure. Photonic computational architecture can be similar to the architectures 200, 300 discussed previously with reference to FIGS. 2-3. Accordingly, the architecture can include a plurality of optical components (e.g., optical processing units, couplers, waveguides, and so forth.) The method includes applying an optimization routine to design the photonic computational architecture. In some embodiments, the optimization routine includes defining a loss function (block 410), defining an initial structure (block 420), determining values for at least one structure parameter and/or at least one functional parameter (block 430), and defining a final structure (block 440). In some embodiments, instead of defining an initial structure, the optimization routine itself may generate the initial structure.

At block 410, a loss function is defined within a simulation space encompassing the photonic computational architecture. In some implementations, the loss function corresponds to an electromagnetic field having an operative wavelength within the computational architecture resulting from an interaction between an input electromagnetic field at the operative wavelength and the one or more optical components of the photonic computational architecture. The input electromagnetic field can be the optical signals 210, 301, discussed previously with reference to FIGS. 2-3.

In some implementations, the loss function is based on a target electric field. For example, the loss function can be based on a target electric field of a modulated output signal of the plurality of optical processing units 220, or the secondary optical processing units 320a-c, as discussed previously with reference to FIGS. 2-3. Additionally, or alternatively, the loss function can be based on a target electric field that is emitted as an output signal from photonic computational architecture. In some implementations, the target electric field is defined, at least partially, by an intensity profile corresponding to the output signal. For example, the target electric field can include a target Gaussian intensity profile. In some implementations, the loss function is associated with, for example, a signal-to-noise ratio and/or a power waveform of an output electromagnetic signal.

In some implementations, the loss function can account for manufacturing cost, feasibility, and/or materials available. For example, it may not be feasible to design some of the optical components of the photonic computational architecture with more than one material. It may not be feasible for the optical components to include curvatures less than a certain size. Due to budget considerations, it may not be feasible to design the optical components with extraordinarily expensive materials. The loss function can account for these considerations and treat them as penalties.

At block 420, an initial structure for the photonic computational architecture is defined. The initial structure can be defined to include, for example, desired modulation formats, a desired number and/or type of computational units, a desired number and/or type of couplers, a number of waveguides, and so forth. For example, the initial structure can be the stacked photonic computational architecture 200 discussed previously with reference to FIG. 2. In some implementations, the initial structure can be separated into a plurality of voxels. In some implementations, the computational inverse design tool 100 of FIG. 1A separates the structures into voxels. In some implementations, at least some of the voxels have a dimension smaller than an operative wavelength of the architecture (e.g., $0.5\lambda$ or less, $0.2\lambda$ or less, $0.1\lambda$ or less, $0.05\lambda$ or less). The dimensions of the voxels can be selected based on, for example, manufacturing tolerances, minimum feature size that a given process can allow, or both.

At block 430, values are determined for at least one structural parameter and/or at least one functional parameter of the one or more optical components of the architecture. For example, values can be determined for a refractive index at each voxel of an optical component (i.e., structural parameter). Determined values can be associated with a thickness, composition, and/or shape of an optical component. In some implementations, the determined values are associated with the thickness, composition, and/or shape of one or more computational units of the initial structure, one or more couplers of the initial structure, and/or the waveguide region of the initial structure. As another example, an insertion loss percentage (i.e., functional parameter) can be determined for the one or more couplers of the initial structure. The values are determined by solving Maxwell's equations to optimize the loss function in accordance with the initially defined structure. For example, the values can be determined such that a loss (e.g., as defined in terms of signal-to-noise ratio and/or intensity), in accordance with the defined loss function, is within a target loss threshold. Thus, values for the structural and functional parameters of the one or more components of the computational architecture can be determined in such a manner that loss is minimized (or maximized). In some implementations, the Maxwell's equations are solved using a finite-difference time domain solver. In some implementations, the finite-difference time domain solver includes the computational inverse design tool 100 described earlier with reference to FIG. 1A.

At block 440, a final structure for the computational architecture is defined based on the determined values of the structural and/or functional parameters. For example, based on the determined values, the material composition of each optical component can be determined. Examples of final structures that can be determined also include the type of material to use for a waveguide region, the coupling type for each optical coupler, the thickness of an optical component, and so forth. In some implementations, the final structures of the optical components are designed such that the computational architecture minimizes intensity loss of a signal being processed by the computational architecture.

In some aspects, implementations described in the present disclosure may rely on machine learning engines and machine learning algorithms to perform generative design tasks. Generative design may, in some aspects, mimic an evolutionary problem-solving process, which uses inputs such as design goals, computes hundreds (if not thousands or millions) of potential solutions, and selects one or more best solutions from the multitude of solution permutations. Indeed, in some aspects, machine learning engines applied to a generative design process may generate or process thousands, or even millions, of design choices or test configurations and learn from each iterative solution. Thus, aspects of the described implementations may use the machine learning engines in a generative design process to generate unique and bespoke solutions beyond those that a human being, alone, could create, to arrive at the best design solution. In some aspects, the machine learning engines and algorithms of the generative design process may rely on algorithmic and parametric modeling within a process that includes a design schema, one or more machine learning engines configured to create variations, and one or more machine learning engines configured to select desirable outcomes.

Figure 5:
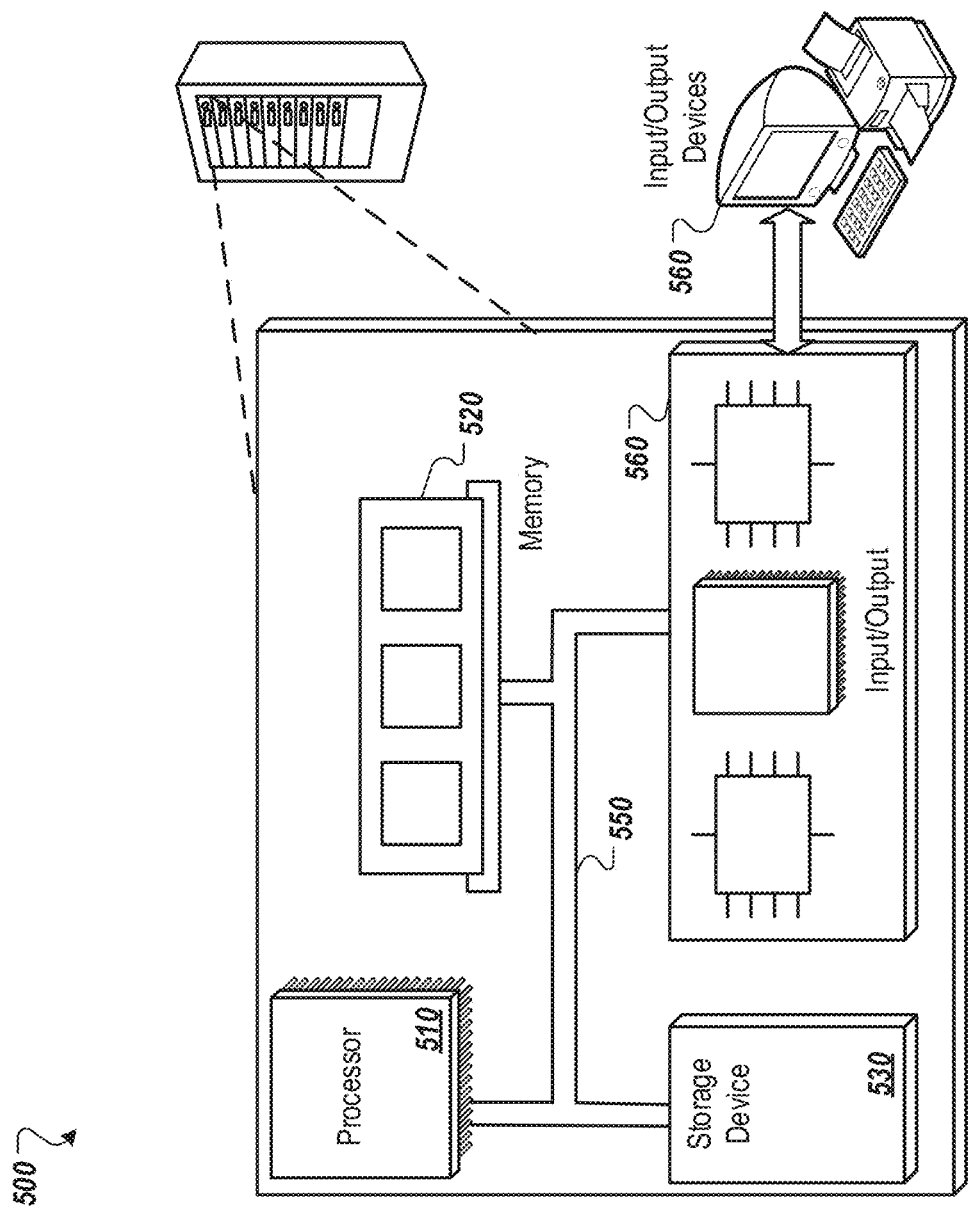
FIG. 5 is a schematic diagram of an example computer system, according to one or more embodiments of the present disclosure.

FIG. 5 is a schematic diagram of an example computer system 500. The system 500 can be used to carry out the operations described in association with any of the computer-implemented methods described previously, according to some implementations. In some implementations, computing systems and devices and the functional operations described in this specification can be implemented in digital electronic circuitry, in tangibly-embodied computer software or firmware, in computer hardware, including the structures disclosed in this specification (e.g., machine learning engine(s)) and their structural equivalents, or in combinations of one or more of them. The system 500 is intended to include various forms of digital computers, such as laptops, desktops, workstations, personal digital assistants, servers, blade servers, mainframes, and other appropriate computers, including vehicles installed on base units or pod units of modular vehicles. The system 500 can also include mobile devices, such as personal digital assistants, cellular telephones, smartphones, and other similar computing devices. Additionally the system can include portable storage media, such as, Universal Serial Bus (USB) flash drives. For example, the USB flash drives may store operating systems and other applications. The USB flash drives can include input/output components, such as a wireless transmitter or USB connector that may be inserted into a USB port of another computing device.

The system 500 includes a processor 510, a memory 520, a storage device 530, and an input/output device 560. Each of the components 510, 520, 530, and 560 are interconnected using a system bus 550. The processor 510 is capable of processing instructions for execution within the system 500. The processor may be designed using any of a number of architectures. For example, the processor 510 may be a CISC (Complex Instruction Set Computers) processor, a RISC (Reduced Instruction Set Computer) processor, or a MISC (Minimal Instruction Set Computer) processor.

In one implementation, the processor 510 is a single-threaded processor. In another implementation, the processor 510 is a multi-threaded processor. The processor 510 is capable of processing instructions stored in the memory 520 or on the storage device 530 to display graphical information for a user interface on the input/output device 560.

The memory 520 stores information within the system 500. In one implementation, the memory 520 is a computer-readable medium. In one implementation, the memory 520 is a volatile memory unit. In another implementation, the memory 520 is a non-volatile memory unit.

The storage device 530 is capable of providing mass storage for the system 500. In one implementation, the storage device 530 is a computer-readable medium. In various different implementations, the storage device 530 may be a floppy disk device, a hard disk device, an optical disk device, or a tape device.

The input/output device 560 provides input/output operations for the system 500. In one implementation, the input/output device 560 includes a keyboard and/or pointing device. In another implementation, the input/output device 560 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory, a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer. Additionally, such activities can be implemented via touchscreen flat-panel displays and other appropriate mechanisms.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include a local area network (LAN), a wide area network ("WAN), peer-to-peer networks (having ad-hoc or static members), grid computing infrastructures, and the Internet.

The computer system can include clients and servers. A client and server are generally remote from each other and typically interact through a network, such as the described one. The relationship of client and server arises by virtue of computer programs running on the respective computers and having a client-server relationship to each other.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results.

What is claimed is:

1. A method for designing a photonic integrated circuit having a computational architecture, the photonic integrated circuit comprising a primary optical processing unit, two or more secondary optical processing units, optical couplers configured to couple each of the secondary optical processing units to the primary optical processing unit via respective waveguides, the method comprising:

defining a loss function within a simulation space composed of a plurality of voxels, the simulation space encompassing the primary and two or more secondary optical processing units, the waveguides, and optical couplers, the loss function corresponding to a target insertion loss resulting from an interaction between an input electromagnetic field and the optical couplers;

defining an initial structure for the photonic integrated circuit in the simulation space, at least some of the voxels corresponding to at least one of the optical couplers and having a dimension smaller than the one or more wavelengths;

determining, using a computer system, values for at least one structural parameter and/or at least one functional parameter for each of the optical couplers, the waveguides, and the primary and two or more secondary optical processing units using a numerical solver to solve Maxwell's equations so that a loss determined according to the loss function is within a threshold loss; and defining a final structure of the photonic integrated circuit based on the values for the one or more structural and/or functional parameters.

2. The method of claim 1, wherein the primary optical processing unit is configured to generate an optical signal.

3. The method of claim 2, wherein the primary optical processing unit is configured to transmit the optical signal to each of the secondary optical processing units according to one or more features of the optical signal.

4. The method of claim 3, wherein each portion of the optical signal corresponds to a different wavelength range for each secondary optical processing unit.

5. The method of claim 2, wherein at least one of the two or more secondary optical processing units is configured to perform, on the optical signal, at least one of amplitude modulation, phase modulation, spatial mode modulation, and polarization modulation.

6. The method of claim 2, wherein the primary optical processing unit is configured to read and/or modulate at least a portion of the optical signal before transmitting the optical signal to the two or more secondary optical processing units.

7. The method claim 1, further comprising one or more additional primary optical processing units, each additional primary optical processing unit being communicatively coupled to additional secondary optical processing units.

8. The method of claim 1, wherein each waveguide is connected to a first optical coupler connected to the primary optical processing unit and a second optical coupler connected to one of the two or more secondary optical processing units.

9. The method of claim 1, wherein at least one of the waveguides is fabricated on a lithium niobate substrate.

10. The method of claim 1, wherein the at least one functional parameter comprises an operative wavelength, the at least one structural parameter comprises a material of each of the optical couplers and the primary and two or more secondary optical processing units, and wherein at least some of the voxels have a dimension of not more than 0.1 times the operative wavelength in the material with the largest refractive index.

11. A photonic integrated circuit having a computational architecture, comprising:
a primary optical processing unit;
two or more secondary optical processing units;
optical couplers configured (i) to couple each of the secondary optical processing units to the primary optical processing unit via respective waveguides and (ii) for transmitting and receiving an optical signal;
wherein the primary and two or more secondary optical processing units, the optical couplers, and the waveguides are manufactured according to a computer-implemented design process for the photonic integrated circuit that comprises:
defining a loss function within a simulation space composed of a plurality of voxels, the simulation space encompassing the primary and two or more secondary optical processing units and the at least one of the optical couplers, the loss function corresponding to a target insertion loss resulting from an interaction between an input electromagnetic field and the optical couplers;
defining an initial structure for the photonic integrated circuit in the simulation space, at least some of the voxels corresponding to at least one of the optical couplers and having a dimension smaller than the one or more wavelengths;
determining, using a computer system, values for at least one structural parameter and/or at least one functional parameter for each of the optical couplers, the waveguides, and the primary and two or more secondary optical processing units using a numerical solver to solve Maxwell's equations so that a loss determined according to the loss function is within a threshold loss; and
defining a final structure of the photonic integrated circuit based on the values for the one or more structural and/or functional parameters.

12. The photonic integrated circuit of claim 11, wherein primary optical processing unit is configured to generate the optical signal.

13. The photonic integrated circuit of claim 12, wherein the primary optical processing unit is configured to transmit the optical signal to each of the secondary optical processing units according to one or more features of the optical signal.

14. The method of claim 13, wherein each portion of the optical signal corresponds to a different wavelength range for each secondary optical processing unit.

15. The photonic integrated circuit of claim 12, wherein at least one of the two or more optical processing units is configured to perform, on the optical signal, at least one of amplitude modulation, phase modulation, spatial mode modulation, and polarization modulation.

16. The photonic integrated circuit of claim 12, wherein the primary optical processing unit is configured to read and/or modulate at least a portion of the optical signal before transmitting the optical signal to the two or more secondary optical processing units.

17. The photonic integrated circuit of claim 11, further comprising one or more additional primary optical processing units, each additional primary optical processing unit being communicatively coupled to additional secondary optical processing units.

18. The photonic integrated circuit of claim 11, wherein each waveguide is connected to a first optical coupler connected to the primary optical processing unit and a second optical coupler connected to one of the two or more secondary optical processing units.

19. The photonic integrated circuit of claim 11, at least one of the waveguides is fabricated on lithium niobate substrates.

20. The photonic integrated circuit of claim 11, wherein the at least one functional parameter comprises an operative wavelength, the at least one structural parameter comprises a material of each of the optical couplers and the primary and two or more secondary optical processing units, and wherein at least some of the voxels have a dimension of not more than 0.1 times the operative wavelength in the material with the largest refractive index.

* * * * *